United States Patent [19]
Okada et al.

[11] Patent Number: 4,496,687
[45] Date of Patent: Jan. 29, 1985

[54] AQUEOUS EMULSION-TYPE SILICONE COMPOSITIONS

[75] Inventors: Fumio Okada; Toshio Oba; Morizo Nakazato, all of Gunma, Japan

[73] Assignee: Shin-Etsu Chemical Co., Ltd., Tokyo, Japan

[21] Appl. No.: 574,669

[22] Filed: Jan. 27, 1984

Related U.S. Application Data

[63] Continuation-in-part of Ser. No. 444,206, Nov. 24, 1982, abandoned.

[30] Foreign Application Priority Data

Nov. 27, 1981 [JP]  Japan ................................ 56-190115

[51] Int. Cl.$^3$ ............................................. C08L 83/02
[52] U.S. Cl. ..................................... 524/859; 524/130; 524/131; 524/132; 524/156; 524/158; 524/195; 524/394; 524/398; 524/399; 524/588; 524/710; 524/745; 524/789; 524/837; 524/838; 524/860; 528/901
[58] Field of Search ............... 524/130, 131, 132, 156, 524/158, 195, 394, 398, 399, 588, 710, 745, 789, 837, 838, 859, 860; 528/901

[56] References Cited

U.S. PATENT DOCUMENTS 3,817,894  6/1974  Butler et al. ...................... 524/236
4,391,765  7/1983  Lee et al. .............................. 521/65

Primary Examiner—Melvyn I. Marquis
Attorney, Agent, or Firm—Toren, McGeady and Stanger

[57] ABSTRACT

The invention provides a novel organopolysiloxane-containing aqueous emulsion composition which, upon removal of water by drying at room temperature, can give a cured rubbery elastomer having excellent mechanical properties and exhibiting strong adhesion to the substrate on which it has been cured. The inventive composition is prepared by blending (A) an aqueous emulsion of an organopolysiloxane having silicon-bonded hydroxy groups and emulsified in water by use of an anionic surface active agent, (B) a mixture of a reaction product of a carboxylic acid anhydride with an amino-functional organosilane and a colloidal silica in the form of an aqueous suspension and (C) a curing catalyst in limited proportions.

12 Claims, No Drawings

AQUEOUS EMULSION-TYPE SILICONE COMPOSITIONS

BACKGROUND OF THE INVENTION

This is a continuation-in-part application from the copending U.S. patent application Ser. No. 444,206 filed Nov. 24th, 1982 and now abandoned.

The present invention relates to an aqueous emulsion-type silicone composition or, more particularly, to an aqueous emulsion-type silicone-containing composition which is very stable and storable over a long period of time in a wide range of the values of pH of the composition and is capable of being cured and converted even at room temperature into a rubbery elastomer having excellent rubbery properties upon removal of water to exhibit good adhesive bonding to the surface of various kinds of substrate materials on which it is dried and cured.

Various types of compositions are known in the prior art as an aqueous emulsion-type silicone composition capable of being cured and converted into a silicone elastomer by drying. These known compositions are characteristic in their performance forming an elastomer upon removal of the water contained therein and such a characteristic performance of the composition is utilized in their application as a coating material. Notwithstanding the importance of the adhesive bonding to the substrate surface in a coating material, conventional aqueous emulsion-type silicone compositions are not always satisfactory in this respect of adhesive bonding.

For example, the specification of Japanese Patent Kokai No. 56-16553 discloses a silicone emulsion composition having a value of pH in the range from 9 to 11.5 and comprising an organopolysiloxane having silicon-bonded hydroxy groups and emulsified with stability by use of an anionic surface active agent, a colloidal silica and an organic tin compound or an organic amine compound. Compositions of this type have several problems when the alkalinity exhibited by the aqueous emulsion per se is high and in the relatively poor adhesive bonding of the silicone elastomer formed therefrom on to the surface of various kinds of substrate materials.

In recent years, on the other hand, various attempts have been undertaken with an object to improve the adhesive bonding of the aqueous emulsion-type silicone composition of the above described type. For example, the specification of Japanese Patent Kokai No. 54-131661 discloses an organopolysiloxane latex composition which is obtained, for example, by the emulsion polymerization of a cyclic organopolysiloxane and a functional group-containing organotrialkoxysilane such as an aminoalkyl trialkoxysilane and the like in the presence of a surface active agent of the types of sulfonates or a cationic surface active agent such as quaternary ammonium salts, which latter class is preferred when an amino-functional organosilane is used in combination. Furthermore, another type of organopolysiloxane latex composition is disclosed in the specification of U.S. Pat. No. 3,817,894 which is composed of a block-wise organopolysiloxane copolymer formed of dimethylsiloxane units and monophenylsiloxane units, water, a cationic surface active agent, a non-ionic surface active agent, a filler and an amino-functional alkoxysilane.

These organopolysiloxane latex compositions are, however, not free from the disadvantages of poor storability because most of them contain a cationic surface active agent as an essential component thereof in comparison with those prepared by use of an anionic surface active agent. As is known, the surface active agents used in the preparation of the organopolysiloxane latex compositions are mostly anionic since cationic surface active agents are less preferred (see, for example, Japanese Patent Publication No. 43-18800) in respect of the storability of the composition while serious drawbacks are sometimes unavoidable in the use of an anionic surface active agent that the latex composition exhibits unduly large increase in the viscosity or a phenomenon of gelation, i.e. formation of an insoluble matter or precipitates, when the latex composition is admixed with an amino-functional silane or a partial hydrolysis-condensation product thereof with an object to improve the strength of adhesion of the stabilized organopolysiloxane latex composition.

SUMMARY OF THE INVENTION

It is therefore an object of the present invention to provide a novel and improved aqueous emulsion type composition containing an organopolysiloxane, which is capable of being cured and converted into a rubbery elastomer upon removal of the water even at room temperature and freed from the above described problems in the prior art compositions of the similar types due to the incompatible requirements for the increased storability or stability and improved performance of adhesion when the latex composition is admixed with an organosilane having a functional amino group or a partial hydrolysis product thereof.

Thus, the organopolysiloxane-containing aqueous emulsion-type composition of the invention comprises:
(A) an aqueous organopolysiloxane emulsion comprising
  (A-1) 100 parts by weight of an organopolysiloxane having at least two hydroxy groups directly bonded to the silicon atoms in a molecule,
  (A-2) from 0.3 to 20 parts by weight of an anionic surface active agent, and
  (A-3) water as the dispersant of the components (A-1) and (A-2),
(B) from 1 to 60 parts by weight as solid of a uniform dispersion comprising
  (B-1) from 0.1 to 20% by weight, based on the component (B-2) mentioned below as solid, of a reaction product of a carboxylic acid anhydride with an organosilane having a functional amino group in a molecule or a hydrolysis product thereof, and
  (B-2) a colloidal silica in the form of an aqueous suspension, and
(C) a catalytic amount of a curing catalyst.

DETAILED DESCRIPTION OF THE PREFERRED EMBODIMENTS

The above described organopolysiloxane-containing aqueous emulsion composition of the present invention is very stable and storable over a long period of time and capable of being converted and cured upon removal of the water content into a rubbery elastomer having excellent elastomeric properties and exhibiting good adhesion to the surface of the substrate on which it is dried and cured. The storability and curing performance of the inventive emulsion composition as well as the elastomeric properties and adhesion of the cured product thereof are not affected by the value of pH of the emulsion composition which may range widely from 3 to 12. Furthermore, the inventive emulsion composition can be formulated to have such a consistency that a single coating with the composition can give a cured rubbery layer of the composition having a thickness as large as 5 mm or larger without cracks or other defects.

In the following, the organopolysiloxane-containing aqueous emulsion-type composition of the present invention is described in further detail beginning with the description of each of the essential components of the composition.

In the first place, the component (A) of the composition is an aqueous emulsion of an organopolysiloxane emulsified in water by use of a surface active agent which is preferably anionic. The organopolysiloxane to be emulsified in water should have at least two hydroxy groups directly bonded to the silicon atoms in a molecule. Otherwise, the organopolysiloxane is not particularly limitative in respect of the position of the silicon-bonded hydroxy groups, types of the organic groups bonded to the silicon atoms, molecular configuration, degree of polymerization and the like parameters so that various kinds of conventional hydroxy-containing organopolysiloxanes are suitable for use in the inventive composition. In particular, it is preferable that the organopolysiloxane has a molecular weight of at least 10,000 though not limitative.

Such an organopolysiloxane can be prepared, for example, (1) by the method in which a cyclic organopolysiloxane such as an octaorganocyclotetrasiloxane, e.g. octamethyl cyclotetrasiloxane, is subjected to the ring-opening polymerization reaction, (2) by the method in which a linear-chain or branched-chain organopolysiloxane having at least two hydrolyzable groups such as alkoxy groups, acyloxy groups and the like in a molecule is subjected to a hydrolysis reaction and (3) by the method in which an organohalogenosilane or a mixture of two kinds or more of organohalogenosilanes is subjected to a hydrolysis reaction.

The anionic surface active agents suitable for use in the preparation of the component (A) by emulsifying the above described organopolysiloxane in water include various kinds of conventional ones. In particular, the anionic surface active agent should exhibit a catalytic activity for the emulsion polymerization of the organopolysiloxane such as the sulfonate esters, sulfate esters and phosphate esters having surface activity as well as salts thereof including salts of alkyl sulfates such as sodium lauryl sulfate and the like, alkyl-substituted benzene sulfonic acid such as dodecyl benzene sulfonic acid and the like, alkyl-substituted naphthalene sulfonic acids, salts of polyethylene glycol sulfuric esters, salts of lauryl phosphate and the like as the examples.

The aqueous emulsion of the organopolysiloxane may be prepared in a variety of conventional methods. For example, an aqueous emulsion is readily formed when the organopolysiloxane having at least two silicon-bonded hydroxy groups in a molecule is dispersed directly in water in the presence of an anionic surface active agent. Alternatively, a cyclic organopolysiloxane such as octamethyl cyclotetrasiloxane is first dispersed and emulsified in water in the presence of an anionic surface active agent followed by the ring-opening polymerization under heating with addition of a known catalyst for the reaction to form an organopolysiloxane having at least two silicon-bonded hydroxy groups in a molecule in an emulsified state. It is optional in this in situ formation of the organopolysiloxane as emulsified that the cyclic organopolysiloxane is emulsified with admixture of a trifunctional organosilane represented by the general formula $RSi(OR^1)_3$, in which R is a monovalent hydrocarbon group such as alkyl, alkenyl and aryl groups and $R^1$ is an alkyl group or an acyl group, or the ring-opening polymerization of the emulsified cyclic organopolysiloxane is performed with admixture of a separately prepared aqueous emulsion of the above mentioned trifunctional organosilane compound.

The amount of the anionic surface active agent used in the preparation of the component (A), i.e. the aqueous emulsion of the organopolysiloxane, is usually in the range from 0.3 to 20 parts by weight or, preferably, from 0.5 to 5 parts by weight per 100 parts by weight of the organopolysiloxane. When the amount of the anionic surface active agent is smaller than above, no sufficient effect of emulsification can be obtained to give a desired aqueous emulsion of the organopolysiloxane while an excessively large amount of the anionic surface active agent is detrimental on the rubbery properties, e.g. tensile strength, ultimate elongation and hardness, of the cured product obtained by drying the inventive composition.

The amount of water in the component (A) is of course not limitative insofar as a stable aqueous emulsion can be prepared with the organopolysiloxane in the presence of the anionic surface active agent. Water is used usually in an amount of 25 to 600 parts by weight per 100 parts by weight of the organopolysiloxane.

It is optional that the aqueous emulsion of the organopolysiloxane as the component (A) is prepared by use of a non-ionic surface active agent such as a polyoxyethylene alkyl ether, polyoxyethylene alkyl phenyl ether and the like as well as a fluorine-containing surface active agent belonging to the class of an anionic, non-ionic or amphoteric surface active agent in combination with the above mentioned anionic surface active agent provided that the rubbery properties of the cured product obtained by drying the inventive composition is not adversely affected.

In the next place, the component (B) is admixed in the inventive composition with an object to improve the adhesion of the cured product obtained by drying the inventive composition to the surface of the substrate on which the aqueous composition is dried. The component (B) is also effective in preventing formation of cracks in the cured rubbery layer of the dried composition having a relatively large thickness.

One of the essential constituents in this component (B) is a reaction product of a carboxylic acid anhydride and an organosilane having a functional amino group in a molecule or a hydrolysis product thereof. The amino-functional organosilane above mentioned is an organosilane represented by the general formula $R^2Si(CH_3)_{n-1}(OR^1)_{4-n}$, in which $R^1$ has the same meaning as defined above, $R^2$ is an amino-substituted alkyl group such as 3-aminopropyl, N-(2-aminoethyl)-3-aminopropyl and the like groups and n is a positive integer of 1 or 2. Particular examples of such amino-functional organosilane compounds suitable in the invention include 3-aminopropyl triethoxy silane, N-(2-aminoethyl)-3-aminopropyl methyl dimethoxy silane, 3-aminopropyl methyl diethoxy silane, N-(2-aminoethyl)-3-aminopropyl trimethoxy silane and the like. In the present invention, substantially the same results can be obtained by the use of a product obtained by at least partially hydrolyzing the above named amino-functional organosilane compound in place of the silane compound per se.

The carboxylic acid anhydride to be reacted with the above described amino-functional organosilane compound or a hydrolysis product thereof is exemplified by the anhydrides of various kinds of carboxylic acids such as methyl tetrahydrophthalic acid, benzophenone tetracarboxylic acid, phthalic acid, ethyleneglycol bistrimellitate, maleic acid, pyromellitic acid, succinic acid, trimellitic acid, phenyl maleic acid, methyl hexahydrophthalic acid, hexahydrophthalic acid, dodecyl succinic acid, dichloromaleic acid and chlorendic acid as well as polyanhydrides such as polyazelaic polyanhydride and the like.

The reaction between the amino-functional organosilane compound and the above named carboxylic acid anhydride can readily proceed even at room temperature exothermically by merely blending the reactants together to give the desired reaction product. Although not particularly limitative, it is preferable that the reaction of these reactants is undertaken by diluting the reaction mixture with a suitable organic solvent or a combination of organic solvents such as methyl alcohol, ethyl alcohol, isopropyl alcohol, butyl alcohol, acetone, methyl ethyl ketone, tetrahydrofuran, dimethyl formamide and the like since otherwise gelation may sometimes take place in the reaction product obtained by the reaction.

The molar ratio of the reactants, i.e. the amino-functional organosilane compound or a hydrolysis product thereof and the carboxylic acid anhydride, may usually be equimolar but the use of an excessive amount of either one of the reactants over the other to some extent has no particular disadvantages.

The other essential constituent in the component (B) than the above described reaction product of the amino-functional organosilane compound and the acid anhydride is a colloidal silica in the form of an aqueous suspension, which is not limited to a product of a specific type but preferably has a particle diameter in the range from 10 to 40 nm stabilized with sodium or aluminum ions. Several commercial products readily available on the market as such are satisfactory for the purpose including Snowtex 40 sold by Nissan Chemical Co. and the like.

The proportion of the reaction product of the amino-functional organosilane compound and the acid anhydride and the colloidal silica in the component (B) is such that from 0.1 to 20 parts by weight or, preferably, from 0.5 to 5 parts by weight of the reaction product are taken per 100 parts by weight of the colloidal silica as solid. When the amount of the reaction product is smaller than above, no sufficient improvement can be obtained in the strength of adhesion of the cured rubbery material formed from the emulsion composition by drying to the substrate on which the composition is dried while an excessively large amount of the reaction product may result in inferior flowability of the composition.

The component (B) can be prepared by admixing the reaction product of the amino-functional organosilane compound and the acid anhydride dropwise into the colloidal silica in an aqueous suspension kept at room temperature under agitation. In this admixing procedure, certain amounts of insoluble matter may be formed at the beginning stage but the whole mixture is uniformized on further addition of the reaction product finally to give a slightly turbid flowable mixture.

The amount of blending of this component (B) to the component (A) is from 1 to 60 parts by weight or, preferably, from 3 to 30 parts by weight of the component (B) as solid per 100 parts by weight of the organopolysiloxane in the component (A). When the amount of the component (B) is smaller than above, the rubbery elastomer obtained by drying the emulsion composition may have poor mechanical properties while an excessively large amount of the component (B) results in decreased elongation of the cured rubbery elastomer which may suffer cracking when the emulsion composition is used as a coating material, especially, to give a coating layer of a relatively large thickness.

It should be noted that the reaction product of the amino-functional organosilane compound or a hydrolysis product thereof and the acid anhydride in the component (B) serves not only as an improver agent for the adhesion of the cured rubbery elastomer obtained from the inventive emulsion composition to the surface of the substrate but also to further increase the reinforcing effect of the colloidal silica to the organopolysiloxane in the component (A).

The component (C), which is a curing catalyst, is used to accelerate curing of the rubbery elastomer when water is removed from the inventive emulsion composition. Suitable curing catalysts are exemplified by organotin compounds, i.e. compounds having at least one tin-carbon linkage in a molecule, such as dibutyltin dilaurate, dioctyltin dilaurate, dibutyltin diacetate and the like, metal salts of carboxylic acids such as tin octoate, tin laurate, iron octoate, lead octoate and the like and amine compounds such as n-hexyl amine, guanidine and the like as well as hydrochlorides thereof. It is a convenient way that the curing catalyst as above named is emulsified in advance in water in a conventional manner by use of an emulsifier to give an aqueous emulsion of oil-in-water type, which is then admixed with the components (A) and (B). When the curing catalyst is solid at room temperature, emulsification thereof is facilitated by using a solution of the catalyst or by carrying out the agitation at an elevated temperature higher than the melting temperature of the catalyst.

The amount of this component (C) is not particularly limitative and should be in a catalytic amount determined according to the desired velocity of curing. The amount of the component (C) is usually in the range from 0.01 to 10 parts by weight or, preferably, from 0.1 to 3 parts by weight per 100 parts by weight of the organopolysiloxane in the component (A). When the amount is smaller than 0.01 part by weight, the inventive composition after removal of water cannot be fully cured even on prolonged standing while an excessively large amount of the curing catalyst is rather detrimental on the properties of the cured rubbery elastomer obtained from the inventive composition with increased tendency toward cracking but without further advantages.

In the preparation of the inventive composition by blending the components (A), (B) and (C), it is essential that the component (B) is prepared in advance separately from the component (A) by uniformly mixing the colloidal silica in an aqueous suspension and the reaction product of the amino-functional organosilane compound and the acid anhydride. A preferable procedure for the preparation of the inventive emulsion composition is that the aqueous emulsion containing the organopolysiloxane as the component (A) is first prepared which is then admixed successively with the component (B) prepared separately and then with the component (C) under agitation. The apparatus for the agitation of the mixture may be a conventional mixing machine.

When the procedure for the preparation of the inventive emulsion composition is not exactly as described above but a mixture composed of the component (A), the colloidal silica and the component (C) is first prepared to which the reaction product of the amino-functional organosilane compound and the acid anhydride is admixed, no satisfactory results can be obtained by the formation of a gel-like material which cannot be solubilized to give a uniform emulsion composition even under agitation of highest intensity.

The aqueous emulsion composition of the invention should preferably have a value of pH in the range from 5 to 9 or, more preferably, from 6 to 9 in order to avoid any possible problems in the handling of the composition or, in particular, on the safety of the workers as well as to avoid corrosive attack thereof to the substrate surface although the value of pH is not particularly limitative in other respects. The value of pH of the composition may be controlled by the addition of a suitable acid or alkali such as acetic acid or sodium carbonate and the like depending on the value of pH of the composition as prepared by blending the components (A) to (C).

It is of course optional that the inventive aqueous emulsion composition is admixed with various kinds of additives conventionally formulated in aqueous coating compositions such as thickeners, defoaming agents, pigments, dyes, preservatives, penetrants and the like.

The above described aqueous emulsion composition of the invention containing an organopolysiloxane is useful and widely applicable as a coating composition, fiber treating agent, mold release agent, back-surface releaser of adhesive tapes, binder for inorganic materials and the like.

Following are the examples of the present invention and comparative examples, in which parts are all given by parts by weight.

EXAMPLE 1

Three aqueous emulsions as the component (A) each containing an organopolysiloxane and having a different value of pH were prepared by emulsifying 500 parts of octamethylcyclotetrasiloxane, 25 parts of methyl trimethoxy silane and 10 parts of dodecyl benzene sulfonic acid in 465 parts of water followed by passing the emulsion twice through a homogenizer under a pressure of 3000 p.s.i. to stabilize the emulsion and heating the thus stabilized aqueous emulsion in a flask at 70° C. for 12 hours with subsequent cooling to room temperature and controlling the value of pH to 5.0, 8.0 and 12.0, respectively, by the addition of sodium carbonate after 24 hours of standing. These aqueous emulsions are referred to hereinafter as A-1, A-2 and A-3 for the values of pH of 5.0, 8.0 and 12.0, respectively.

The content of non-volatile matter in each of these aqueous emulsions was 47% by weight and the organopolysiloxane contained in the emulsion and separated therefrom by use of methyl alcohol had a viscosity of 7200 centipoise as a 20% by weight solution in toluene at 25° C.

Separately from the above, 221 parts of 3-aminopropyl triethoxysilane were added dropwise at room temperature into a mixture of 98 parts of maleic acid anhydride and 319 parts of ethyl alcohol under agitation to give a reaction product of the silane and the acid anhydride. Into 1000 parts of a colloidal silica at a pH of 9.3 containing 40 % by weight of the solid content and 0.6% by weight of $Na_2O$ (Snowtex 40, a product by Nissan Chemical Co.) were added dropwise 30 parts of the above prepared alcohol solution of the reaction product at room temperature under agitation to give a somewhat cloudy product having a pH of 3.4, which was used as the component (B-1).

Further, a component (C) was prepared by emulsifying 30 parts of dibutyltin dilaurate and 1 part of polyoxyethylene nonyl phenyl ether in 69 parts of water in a conventional procedure.

The above prepared components (A), (B) and (C) were blended together in a proportion indicated in Table 1 to give Compositions No. 1 to No. 9 below and each of the thus prepared compositions was cast on a plate of a fluorocarbon resin and kept as such at 25° C. for 48 hours in an atmosphere of 60% relative humidity to be dried into a cured rubbery sheet of about 1 mm thickness.

This rubbery sheet was tested for the hardness, tensile strength and ultimate elongation at break according to the procedures specified in JIS K 6301 to give the results shown in Table 1, which also includes the formulations of the components calculated as solid and the results of testing for the comparative compositions No. 10 and No. 11 prepared by omitting the component (B) and by adding instead 15 parts as solid of Snowtex 40 alone (No. 10) or 15 parts of a 97:3 by weight mixture of Snowtex 40 (calculated as solid) and 3-aminopropyl triethoxysilane (No. 11).

Each of the above prepared aqueous emulsion compositions was spread on various kinds of substrate materials including concrete, cement mortar, glass, wood, steel, paper board and asbestos board and dried and cured on the substrate in the same manner as above and the adhesion of the cured rubbery sheet and the substrate surface was examined. The adhesion was complete in each of the cured rubbery layers obtained from the composition according to the invention in which separation of the rubber sheet and the substrate did not take place but the rubbery sheet per se was destroyed when the rubbery sheet was forcibly pulled off the substrate at a velocity of about 300 mm/minute in the vertical direction except for the substrates of the steel plate and paper board where separation could take place at the interface though with a considerably large pulling force. On the contrary, the adhesion of the cured rubber layers obtained from the above prepared comparative compositions No. 10 and No. 11 to the substrate surface was not always complete. The results of this adhesion test with these comparative compositions are shown in Table 2 below, in which the symbols A, B and C each indicate the following condition of adhesion.

TABLE 1

| Composition No. | Components, parts A | Components, parts B | Components, parts C | PH of composition | Hardness (JIS) | Tensile strength, kg/cm² | Ultimate elongation, % |
|---|---|---|---|---|---|---|---|
| 1 | A-1 100 | B-1 7.5 | 1.5 | 4.3 | 14 | 15 | 980 |
| 2 | A-1 100 | B-1 15 | 1.5 | 3.9 | 20 | 20 | 900 |
| 3 | A-1 100 | B-1 30 | 1.5 | 3.7 | 35 | 25 | 850 |
| 4 | A-2 100 | B-1 7.5 | 1.5 | 7.2 | 15 | 17 | 950 |
| 5 | A-2 100 | B-1 15 | 1.5 | 6.5 | 22 | 22 | 880 |

TABLE 1-continued

| Composition No. | Components, parts | | | PH of composition | Properties of cured rubber | | |
|---|---|---|---|---|---|---|---|
| | A | B | C | | Hardness (JIS) | Tensile strength, kg/cm² | Ultimate elongation, % |
| 6 | A-2 100 | B-1 30 | 1.5 | 6.0 | 35 | 27 | 830 |
| 7 | A-3 100 | B-1 7.5 | 1.5 | 11.0 | 15 | 17 | 970 |
| 8 | A-3 100 | B-1 15 | 1.5 | 10.2 | 20 | 21 | 860 |
| 9 | A-3 100 | B-1 30 | 1.5 | 9.4 | 34 | 25 | 830 |
| 10 | A-2 100 | * | 1.5 | 9.5 | 20 | 15 | 600 |
| 11 | A-2 100 | * | 1.5 | 11.0 | 20 | 16 | 650 |
| 12 | A-1 100 | B-2 7.5 | 1.5 | 4.5 | 15 | 15 | 980 |
| 13 | A-1 100 | B-2 15 | 1.5 | 4.2 | 20 | 20 | 900 |
| 14 | A-1 100 | B-2 30 | 1.5 | 4.0 | 35 | 25 | 850 |
| 15 | A-2 100 | B-2 7.5 | 1.5 | 7.6 | 15 | 16 | 960 |
| 16 | A-2 100 | B-2 15 | 1.5 | 6.8 | 21 | 22 | 870 |
| 17 | A-2 100 | B-2 30 | 1.5 | 6.5 | 35 | 27 | 840 |
| 18 | A-3 100 | B-2 7.5 | 1.5 | 11.3 | 15 | 16 | 980 |
| 19 | A-3 100 | B-2 15 | 1.5 | 10.8 | 20 | 22 | 890 |
| 20 | A-3 100 | B-2 30 | 1.5 | 9.6 | 35 | 26 | 870 |

*See text.

TABLE 2

| Substrate | Composition No. | |
|---|---|---|
| | 10 | 11 |
| Concrete | C | A |
| Cement mortar | C | A |
| Glass plate | B | B |
| Wood board | C | B |
| Steel plate | C | B |
| Paper board | B | B |
| Asbestos board | C | A |

Each of the above prepared emulsion compositions was further subjected to curing by drying at room temperature to form a cured rubber layer of 5 mm thickness to find that the cured rubber layers formed from the inventive compositions No. 1 to No. 9 were free from any cracks while those formed from the comparative compositions No. 10 and No. 11 had cracks.

Further, storage test was undertaken with the above prepared emulsion compositions, each of which was kept standing at 25° C. for 3 months. No changes were noted with the inventive compositions No. 1 to No. 9 in the appearance of the emulsion, curing behavior, mechanical properties of the cured rubber sheets and adhesion of the cured rubber layers to the surface of various substrates. The comparative compositions No. 10 and No. 11 were also stable in this storage test.

What is claimed is:

1. An organopolysiloxane-containing aqueous emulsion composition which comprises
(A) an aqueous organopolysiloxane emulsion comprising
  (A-1) 100 parts by weight of an organopolysiloxane having at least two hydroxy groups directly bonded to the silicon atoms in a molecule,
  (A-2) from 0.3 to 20 parts by weight of an anionic surface active agent, and
  (A-3) water as the dispersing medium of the components (A-1) and (A-2),
(B) from 1 to 60 parts by weight as solid of a uniform dispersion comprising
  (B-1) from 0.1 to 20% by weight, based on the component (B-2) mentioned below as solid, of a reaction product of a carboxylic acid anhydride with an organosilane having a functional amino group in a molecule or a hydrolysis product thereof, and
  (B-2) a colloidal silica in an aqueous suspension,
(C) a catalytic amount of a curing catalyst.

2. The organopolysiloxane-containing aqueous emulsion composition as claimed in claim 1 wherein the organopolysiloxane has a molecular weight of at least 10,000.

3. The organopolysiloxane-containing aqueous emulsion composition as claimed in claim 1 wherein the anionic surface active agents is selected from the class consisting of esters of sulfonic acid, sulfuric acid and phosphoric acid and salts thereof.

4. The organopolysiloxane-containing aqueous emulsion composition as claimed in claim 1 wherein the amount of the anionic surface active agent is in the range from 0.5 to 5 parts by weight per 100 parts by weight of the organopolysiloxane.

5. The organopolysiloxane-containing aqueous emulsion composition as claimed in claim 1 wherein the amount of water in the component (A) is in the range from 25 to 600 parts by weight per 100 parts by weight of the organopolysiloxane.

6. The organopolysiloxane-containing aqueous emulsion composition as claimed in claim 1 wherein the oraganosilane having a functional amino group is represented by the general formula $R^2Si(CH_3)_{n-1}(OR^1)_{4-n}$, in which $R^1$ is a monovalent group selected from the class consisting of alkyl and acyl groups, $R^2$ is a monovalent group selected from the class consisting of 2-aminoethyl, 3-aminopropyl and N-(2-aminoethyl)-3-aminopropyl groups and n is a positive integer of 1 or 2.

7. The organopolysiloxane-containing aqueous emulsion composition as claimed in claim 1 wherein the carboxylic acid anhydride is selected from the class consisting of the anhydrides of methyl tetrahydrophthalic acid, benzophenone tetracarboxylic acid, phthalic acid, maleic acid, pyromellitic acid, succinic acid, trimellitic acid, phenyl maleic acid, methyl hexahydrophthalic acid, hexahydrophthalic acid, dodecyl succinic acid, dichloromaleic acid and chlorendic acid, ethyleneglycol bistrimellitate and polyazelaic polyanhydride.

8. The organopolysiloxane-containing aqueous emulsion composition as claimed in claim 1 wherein the amount of the component (B) is in the range from 3 to 30 parts by weight as solid per 100 parts by weight of the organopolysiloxane.

9. The organopolysiloxane-containing aqueous emulsion composition as claimed in claim 1 wherein the curing catalyst is selected from the class consisting of organotin compounds, metal salts of organic acids, amine compounds and hydrochlorides thereof.

10. The organopolysiloxane-containing aqueous emulsion composition as claimed in claim 1 wherein the amount of the curing catalyst is in the range from 0.01 to 10 parts by weight per 100 parts by weight of the organopolysiloxane.

11. The organopolysiloxane-containing aqueous emulsion composition as claimed in claim 1 which has a value of pH in the range from 3 to 12.

12. A method for the preparation of an organopolysiloxanecontaining aqueous emulsion composition comprising
(A) an aqueous organopolysiloxane emulsion comprising
  (A-1) 100 parts by weight of an organopolysiloxane having at least two hydroxy groups directly bonded to the silicon atoms in a molecule,
  (A-2) from 0.3 to 20 parts by weight of an anionic surface active agent, and
  (A-3) water as the dispersing medium of the components (A-1) and (A-2),
(B) from 1 to 60 parts by weight as solid of a uniform dispersion comprising
  (B-1) from 0.1 to 20% by weight, based on the component (B-2) mentioned below as solid, of a reaction product of a carboxylic acid anhydride with an organosilane having a functional amino group in a molecule or a hydrolysis product thereof, and
  (B-2) a colloidal silica in an aqueous suspension, and
(C) a catalytic amount of a curing catalyst, which comprises the steps of:
  (a) dispersing the colloidal silica as the component (B-2) and the reaction product as the component (B-1) in water to form a uniform aqueous dispersion; and
  (b) admixing the above prepared uniform aqueous dispersion with an aqueous emulsion of the organopolysiloxane emulsified in water by the aid of the anionic surface active agent and the curing catalyst.

* * * * *